US006964085B2

(12) United States Patent
Boda

(10) Patent No.: US 6,964,085 B2
(45) Date of Patent: Nov. 15, 2005

(54) MOUNTING CLIP AND RELATED MODULAR STORAGE SYSTEM

(76) Inventor: James C. Boda, 7680 High Point Dr., Merrimac, WI (US) 53561

( * ) Notice: Subject to any disclaimer, the term of this patent is extended or adjusted under 35 U.S.C. 154(b) by 154 days.

(21) Appl. No.: 10/412,623

(22) Filed: Apr. 11, 2003

(65) Prior Publication Data

US 2004/0026934 A1 Feb. 12, 2004

Related U.S. Application Data

(60) Provisional application No. 60/402,466, filed on Aug. 9, 2002.

(51) Int. Cl.[7] .............................. A44B 21/00; A47F 5/00
(52) U.S. Cl. .............................. 24/513; 24/515; 24/517; 24/489; 24/498; 248/316.1; 248/316.2
(58) Field of Search .......................... 24/489, 498, 513, 24/515, 517, 545; 248/316.1; 211/17, 87.01; 16/237, 356; 29/33.17

(56) References Cited

U.S. PATENT DOCUMENTS

| 277,700 | A | * | 5/1883 | Foster ......................... 24/489 |
| 717,367 | A | * | 12/1902 | Ellis ............................. 24/517 |
| 1,332,566 | A | * | 3/1920 | Northup ....................... 24/517 |
| 2,613,243 | A | * | 10/1952 | Frear ............................ 24/515 |
| 3,586,284 | A | * | 6/1971 | Riebold .................. 248/316.1 |
| 3,852,943 | A | * | 12/1974 | Healy ........................... 24/498 |
| 4,798,289 | A | * | 1/1989 | Mobley .................. 248/316.2 |
| 4,979,273 | A | | 12/1990 | Friedrickson, Jr. |
| 5,400,900 | A | * | 3/1995 | Myers et al. ................. 24/513 |
| 5,636,819 | A | | 6/1997 | Kettlestrings |

FOREIGN PATENT DOCUMENTS

GB           1 419 205           12/1975

OTHER PUBLICATIONS

Form PCT/ISA/220, Notification of Transmittal of the International Search Report or the Declaration, Dec. 12, 2003, 7pgs.

* cited by examiner

Primary Examiner—Victor Sakran
(74) Attorney, Agent, or Firm—Smith Law Office

(57) ABSTRACT

A storage system having a releasably mounted mounting clip that can be connected to a wall stud or ceiling joist. A variety of storage components can be joined to the mounting clip. The mounting clip can also be used to join boards and panels to construct furniture and stand-alone storage units.

7 Claims, 17 Drawing Sheets

MOUNTING CLIP AND RELATED MODULAR STORAGE SYSTEM

This application is a continuation-in-part of Provisional Application No. 60/402,466 filed Aug. 9, 2002, the disclosure of which is incorporated by reference herein.

FIELD AND BACKGROUND OF THE INVENTION

This invention relates generally to storage systems and, more particularly, to a modular storage system having as its foundation a mounting clip that mounts to exposed wall studs or ceiling joists without the use of tools or additional fasteners. It provides a safe and secure connection that can be removed and reinstalled as desired.

In garages, basements, shops, offices, and buildings under construction, there are collections of items that are stored for short and long term. With varying degrees of organization, there can be clothing, tools, office supplies, sporting equipment, bicycles, recreational toys, yard furniture, yard tools, paint cans, gas cans, gardening accessories, lawn chemicals and any other item that can be stored in such areas. The degree of organization depends in large part on the availability of suitable storage space that may or may not be dedicated to the particular item being stored.

The notion of "a place for every thing and every thing in its place" has spurred home centers to stock large inventories of shelving and related items. Entire stores are now devoted to selling products for efficient storage of household and office items.

Shelving can be mounted on a wall and provide ample space for small items that are not desirably stored on a floor. Shelves and specialized racks are mounted on walls or ceilings using nails, screws or other suitable connectors. Mounting these items can vary in the degree of difficulty and the success and safety of a storage unit will, in large part, depend upon the skill of the installer.

To simplify installation, storage systems are known that use a single type of wall connection component on which various types of hangers can be mounted. A wall connection in one such system is a vertical standard having a series of vertical slots into which shelf brackets are inserted. The standards are screwed to a wall and are most secure when the screws are driven into the wooden studs supporting the wall.

Shelves are then mounted on the brackets and a number of different hooks, racks, and hangers can then be attached to store clothing, linens, office supplies, kitchen sundries, shop and yard tools, bicycles, skis and other sporting equipment.

These systems enable one to master the installation of a single type of component and realize the benefit of numerous different storage receptacles that are for general storage or dedicated receptacles. They typically provide a permanent installation of the standard, but are able to be rearranged with whatever storage receptacle is required for a given time. The systems are popular and efficient organizers, but they tend to be expensive and require numerous components for even basic installations.

Different types of clips, hangers, and mounts have been devised to simplify storage and/or installation. See for example, U.S. Pat. Nos. 2,852,802; 3,586,284; 4,286,444; 5,067,200; 5,172,529; 5,199,218; 5,842,581; and 6,315,134.

Despite efforts in the prior storage systems, there is none that provides a truly secure connection that can be installed without the use of tools. There is no known system that permits easy relocation of a mounting standard to suit changing storage needs. Further, there is no known storage system that provides installers of any skill level the identical measure of safety and precision for the wall or ceiling connection. Finally, there is no known system having a connector that is versatile enough to be used as a connector for assembly of "knock-down" or temporary furniture that can be used on construction sites, for example.

SUMMARY OF THE INVENTION

The present invention provides a mounting clip that can be installed on an exposed wall stud or ceiling joist without the use of tools. It provides a secure connection for a variety of hangers, receptacles, or other useful articles that can be supported on a wall or ceiling. The mounting clip of the invention can be installed, removed and reinstalled with consistent strength of the connection. The connection is so strong that it can be used to permanently secure plumbing, electrical and other building components in place. A mounting clip in accordance with the present invention can also be used to assemble temporary furniture and stand-alone storage units that require no connection to a wall.

The present invention is adaptable for use with any number of storage components that may be shelving units, racks, receptacles, or other dedicated storage unit. The mounting clip includes a clamp and an accessory mount. The clamp secures a clip to a board, pipe, or panel and the accessory mount enables connection to a variety of storage components.

One embodiment of the present invention is directed to a mounting clip that has a base plate, a clamping jaw, and a hand-operated lever that pivots to secure the clip to any exposed wooden building stud or joist component. The mounting clip's base plate and clamping jaw include opposing teeth that penetrate the wood when the lever is pivoted about its hinge.

A hinge is used to join the base plate and clamping jaw and enable relative clamping movement of the two. Preferably, the hinge is an over-the-center type that provides a very secure clamping action that is safe and consistent every time the mounting clip is installed. When the lever has been operated to secure the mounting clip into place there is one or more tab or "ear" that extends up adjacent to the clamping jaw. The tab has a hole through it that can receive a pin only when the mounting clip is in a fully installed position to serve as a clip lock. The base plate and clamping jaw must pivot relative to one another to be disengaged from the stud. To pivot relative to one another requires the base plate to move relative to the ear. This arrangement enables the pin in the tab holes to prevent accidental or unintentional disengagement when in place.

The clamping mechanism of the base plate and clamping jaw is activated by a lever that is hinged to the base plate at a location that is offset form the hinge that joins the base plate and clamping jaw. The optimum arrangement of hinges permits installation and removal by hand without the use of tools.

The pin is inserted through the hole in the tab and can serve the additional function of supporting any kind of storage system component that can possibly be designed to be joined to the pin. Shelf brackets, hooks, racks, baskets, cabinets, and other storage components are easily joined to the mounting clip by the pin. The pin thus prevents the clip from being disengaged and can simultaneously provide a connection point to a wall or ceiling. The pin can also support a pivoting storage component that can move relative to the clip due to the hinge action provided by the pin.

The clips are inexpensive to manufacture relative to the popular shelf standards used in modular storage systems today.

DESCRIPTION OF THE PREFERRED EMBODIMENTS

Figure 1:
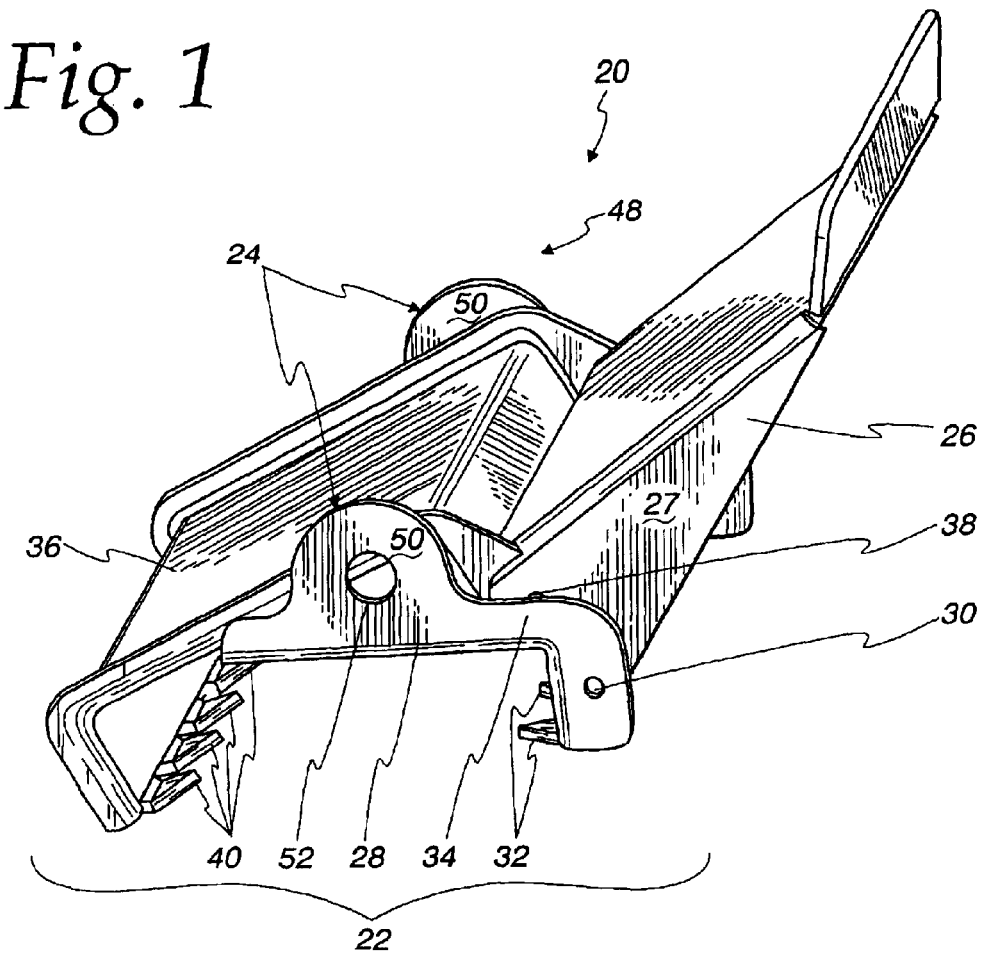
FIG. 1 is a perspective view of a clip in accordance with the present invention, in an open position.

In the following detailed description of drawings the same reference numeral will be used to identify the same or similar elements in each of the figures. FIGS. 1 through 4 illustrate a mounting clip 20 in accordance with the present invention. The mounting clip 20 generally includes a clamp 22 and one or more accessory mount 24. The clamp 22 in the illustrated embodiment includes a lever 26, a base plate 28 joined to the lever 26 by a hinge 30, and a clamping jaw 36 joined to the lever 26 by another hinge 38. FIGS. 1 through 4 illustrate the mounting clip 20 moving from an opened position (FIG. 1), through intermediate positions (FIGS. 2 and 3), to a closed position (FIG. 4).

The illustrated lever 26 has triangular flanges 27, which provide a location for connecting the base plate hinge 30 and the clamping jaw hinge 38 to the lever. The two hinges 30 and 38 are spaced apart to provide sufficient leverage to secure the mounting clip 20 to a stud 56.

The base plate 28 is preferably bent into an L-shape as illustrated, and has inwardly extending teeth 32 at one end and outwardly extending flanges 34 on the other end. The teeth 32 are shaped and dimensioned to engage and penetrate a wood stud 56 (FIGS. 5 and 6), while the flanges 34 provide a place for joining the lever 26 via a hinge 30.

The clamping jaw 36 has inwardly extending teeth 40 that oppose the base plate teeth 32 to provide a solid stud connection. The clamping jaw 36 is sized to mate with the base plate 28 in the closed position (FIG. 4). In all other positions (FIGS. 1 to 3), the base plate 28 and clamping jaw 36 are at an angle to one another.

The clamping jaw 36 in this illustrated embodiment includes a clip lock 48 that preferably includes upwardly extending flanges or ears 50, between which the base plate 28 is disposed. The ears 50 have aligned holes 52 that receive a pin 54 (FIG. 4), which in turn is joined to any suitable bracket or storage member used in a modular and versatile storage system, as described in more detail below. When a pin 54 is in place, the mounting clip 20 cannot be opened because the base plate 28 must move outward from the clamping jaw 36 to be removed from the stud 56. The displacement of the clamping jaw 36 from the base plate 28 occurs as soon as the mounting clip 20 lever 26 has been raised to release the mounting clip 20. This relationship requires the clip lock to be arranged to prevent even a slight movement of the mounting clip toward the opened position. (See: FIG. 3.) The illustrated clamping jaw 36 is in a dimension sufficient to connect to a nominal 2" wooden member (1½" actual). Should the member be of another size, the clamping jaw 36 can be dimensioned accordingly. With the illustrated embodiment, the clamping jaw 36 is the only piece that would need to be changed for adapting to members of different widths. The lever 26 and the base plate 28 remain the same dimensions, thus saving considerable manufacturing costs.

The mounting clip 20 is illustrated as having teeth 32 that penetrate wood studs as described above. The illustrated teeth are triangular, but they could be other shapes, sizes, and orientations. This design is perfectly acceptable where the resulting indented appearance of the stud is unimportant after the mounting clip 20 is removed. When appearance is important or the mounting clip 20 will be joined to materials that cannot be penetrated by the teeth 32, the mounting clip 20 can be fitted with compressible or high friction materials. Teeth, compressible materials or friction materials are all generally comprised in a category of clamp enhancers, but these may not be necessary when the clamp is designed to exert adequate pressure on the surface to which the clamp is mounted. Friction pads, rubber boots, plastics, adhesives, etc. can be used as clamp enhancers to further secure the mounting clip 20 for added security, and other materials or shapes of teeth can be used as well.

One category of clamp enhancers applies a highly localized pressure on the board or other member by effectively reducing the size of the clamp's interior space when in the closed positions. Without a clamp enhancer of this latter type, the mounting clip 20 defines an interior space dimension. These clamp enhancers effectively reduce the interior space dimension so that the clamping pressure is increased. Further, because the clamp enhancers preferably have a smaller surface area than the faces of the clamp 22, the force exerted by the clamp enhancers is greater. Teeth are thus able to penetrate wood and resilient pads grip better. Clamp enhancers can be: formed integrally with; joined to; or simply disposed in the space that is surrounded by the clamp 22.

The mounting clip 20 is illustrated as being connectable to a substantially rectangular member, but it can be shaped to connect to other shapes as well. For example, pipes, bars, and other round objects can be considered for use with a mounting clip 20 that has an arcuate base plate 28 and clamping jaw 36.

In operation, the mounting clip 20 is placed with the lever 26 in the opened position, the base plate teeth 32 on the opposite side of a stud, and the clamping jaw 36 teeth 40 on the near side of the stud. (See: FIG. 1.) The ear holes are blocked in this position, so no pin 54 can be inserted and no brackets or other components can be added in this open position.

Figure 2:
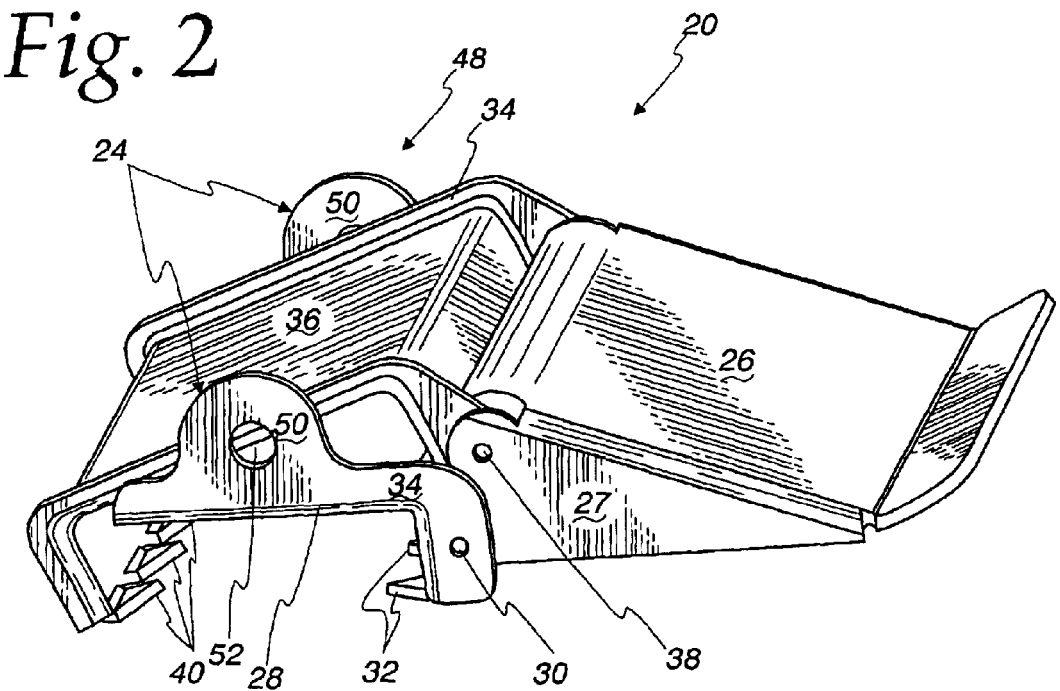
FIG. 2 is a perspective view of the clip of FIG. 1 in a partially closed position.
Figure 3:
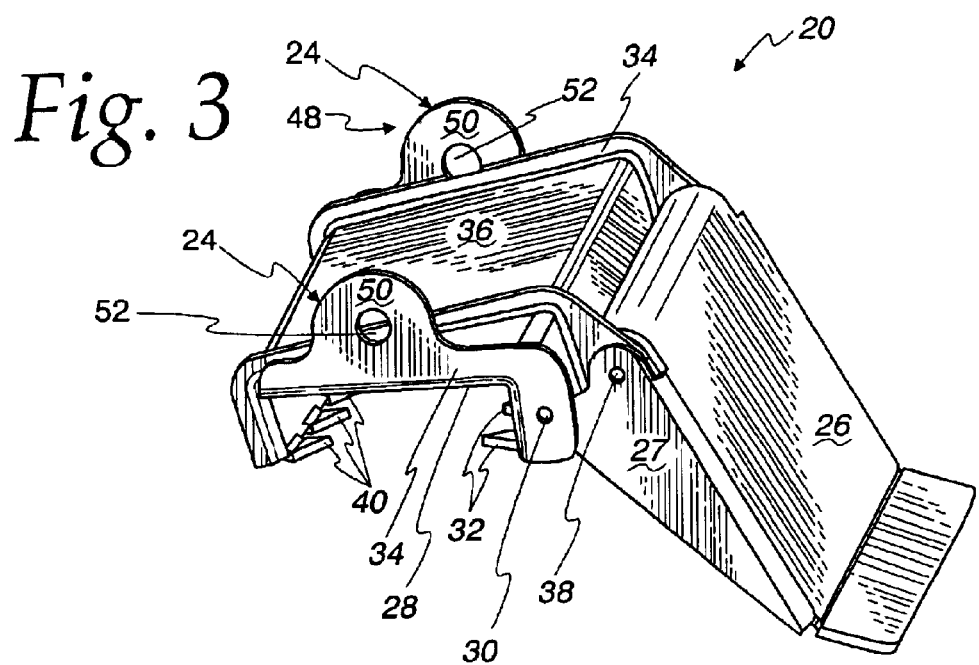
FIG. 3 is a perspective view of the clip of FIG. 1 is a partially closed position.
Figure 4:
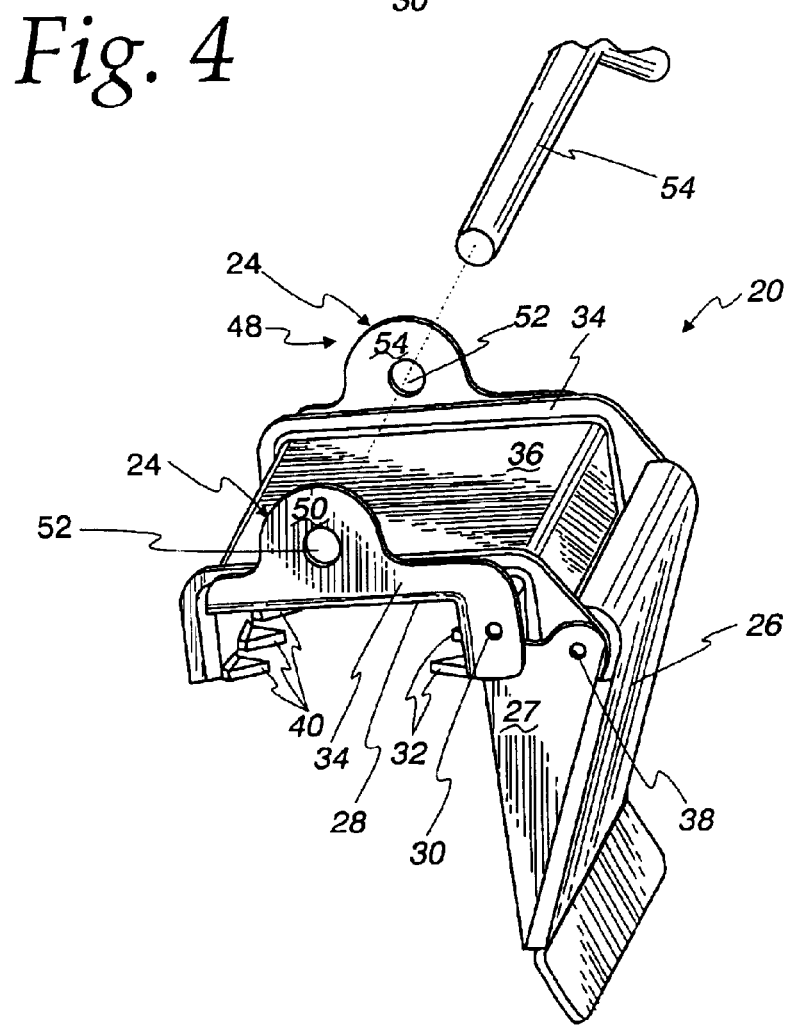
FIG. 4 is a perspective view of the clip of FIG. 1 in a closed position.

FIGS. 2 and 3 show the lever 26 moving toward the closed position, which moves the base plate 28 down and over the clamping jaw 36. The teeth 32 of the respective parts move toward one another to penetrate a wood stud. The spacing of the hinges 30 and 38 provides leverage so that manual force is enough to force the teeth 32 into the wood stud.

In FIG. 4, the mounting clip 20 is in a closed position where the lever 26 is parallel to the long face of the stud, the base plate 28 and clamping jaw 36 are nested in a mating position, and the teeth 32 have penetrated the stud. In this position, and only in this position, it is possible to insert a pin 54 through the clip lock 48, which in the illustrated example is a pair of ear holes in the clamp jaw ears 50.

Figure 5:
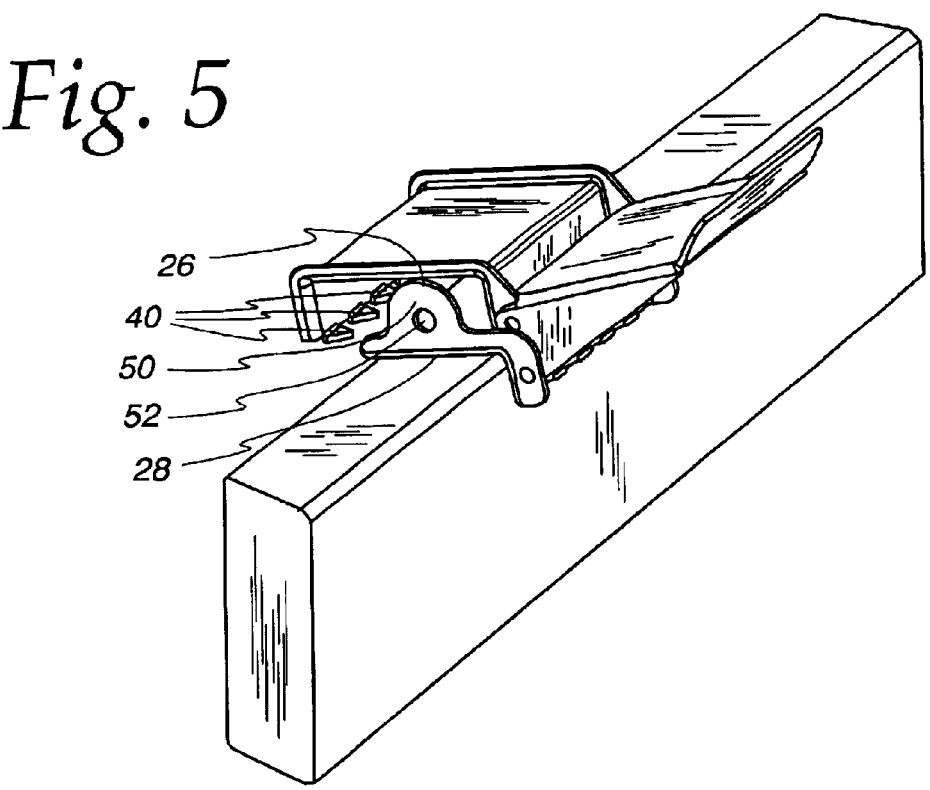
FIG. 5 is the clip of FIG. 1 in a partially closed position being mounted on a wall stud.
Figure 6:
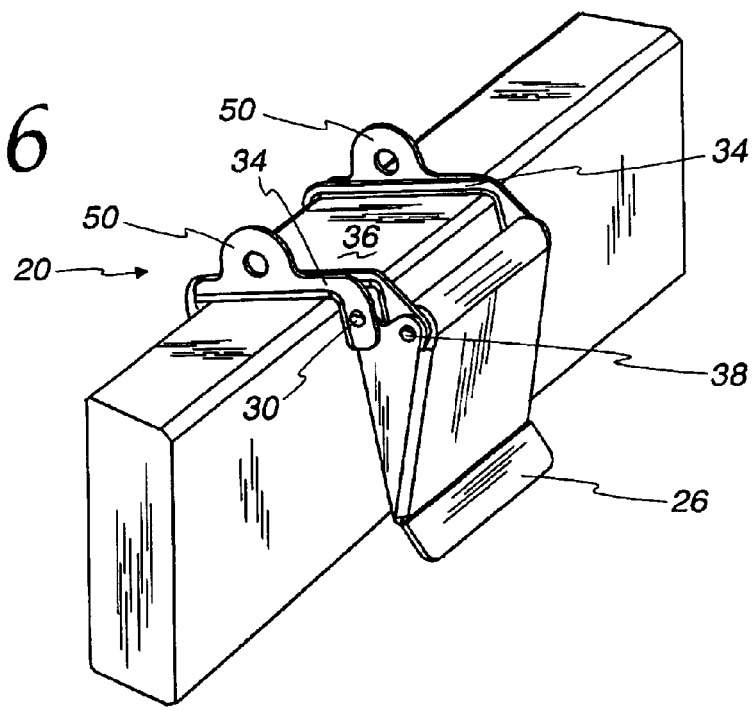
FIG. 6 is the clip of FIG. 1 in a closed position and mounted on a wall stud.

FIGS. 5 and 6 illustrate a mounting clip 20 in the open and closed position, respectively, and in engagement with a stud of a nominal 2"×4" dimension (1½"×3½" actual). In the closed position, the mounting clip 20 is generally L-shaped in cross-section. This shape enables two mounting clips 20 to be joined to opposite sides of a single 2"×4" board at the same point or elevation on the board so that storage or furniture components can extend at equal heights on opposite sides of the board. Of course, 2" wide boards of deeper dimensions can be used, such as 6", 8", 10", 12", etc. The depth is preferably no less than 1½" to provide adequate clamping surface for the mounting clip 20.

A pin 54 (generally referred to as an "accessory mount") can secure brackets of many shapes and sizes to the secured mounting clip 20. The remaining drawings in the packet illustrate brackets, hangers, hinges, and other storage components that mate with the ear holes 52 so that a pin 54 can be inserted to provide secure storage even for very heavy loads. The drawings should be self-explanatory in this regard.

Figure 7:
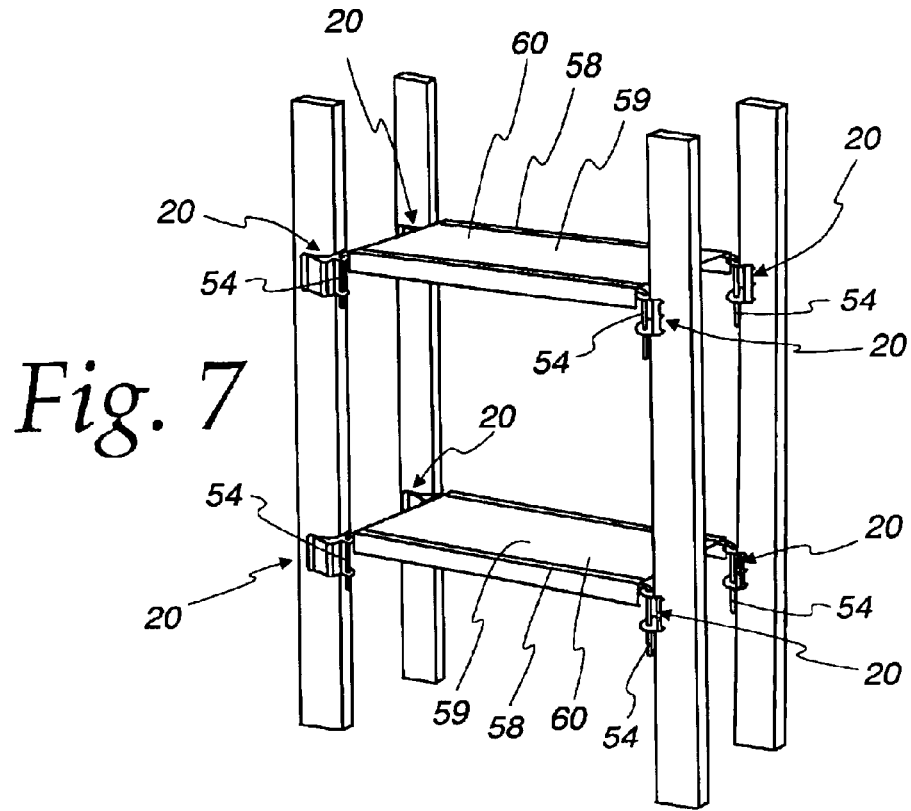
FIG. 7 is a set of eight clips mounted on wood boards to support shelves.

FIG. 7 illustrates a set of eight mounting clips 20 being used to connect four extrusions 58 that have recesses 59 for receiving sheets of material 60 such as plywood, plastic, glass, steel, etc. to construct a self-supporting table and shelving unit. With this embodiment, it is seen that the illustrated mounting clip 20 can be used on any board whether or not the board is used to build a wall or ceiling.

Figure 8:
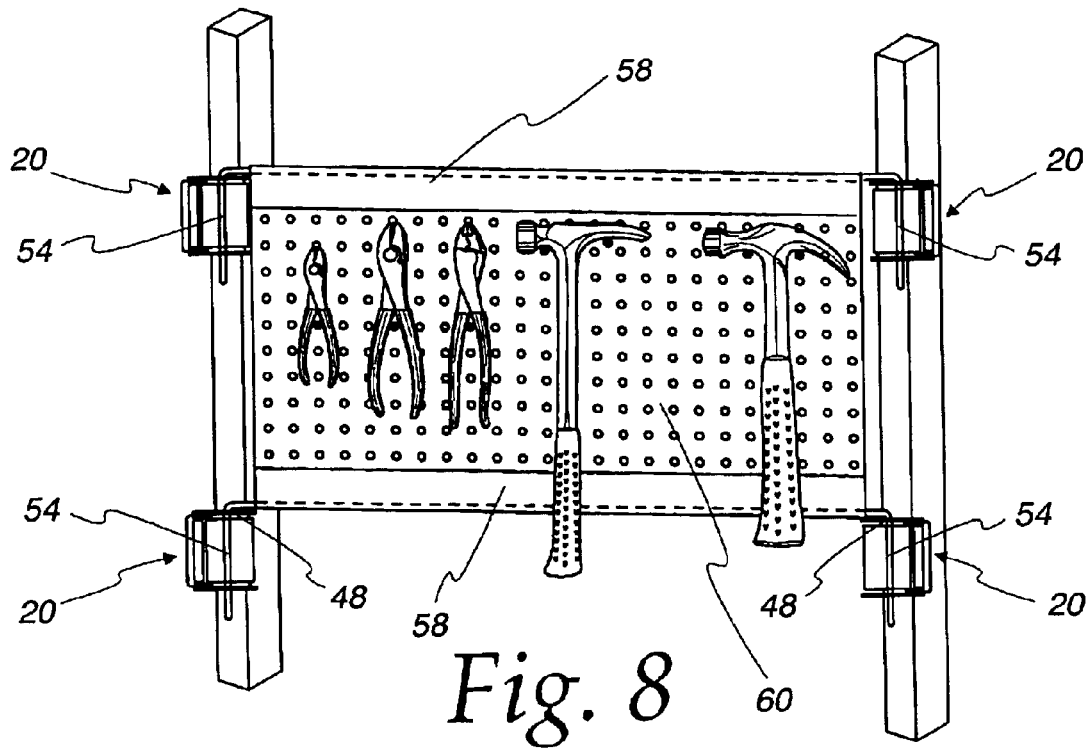
FIG. 8 is a set of four clips mounted on two wall studs to support shelves.

FIG. 8 illustrates a set of four mounting clips 20 used to support a pair of extrusions 58 for a pegboard. The pegboard 62 can be mounted on the extrusions 58 and objects mounted on the pegboard 62. The extrusions 58 in this embodiment can be identical to the extrusions 58 in the FIG. 7 embodiment to provide a generic panel connector.

Figure 9:
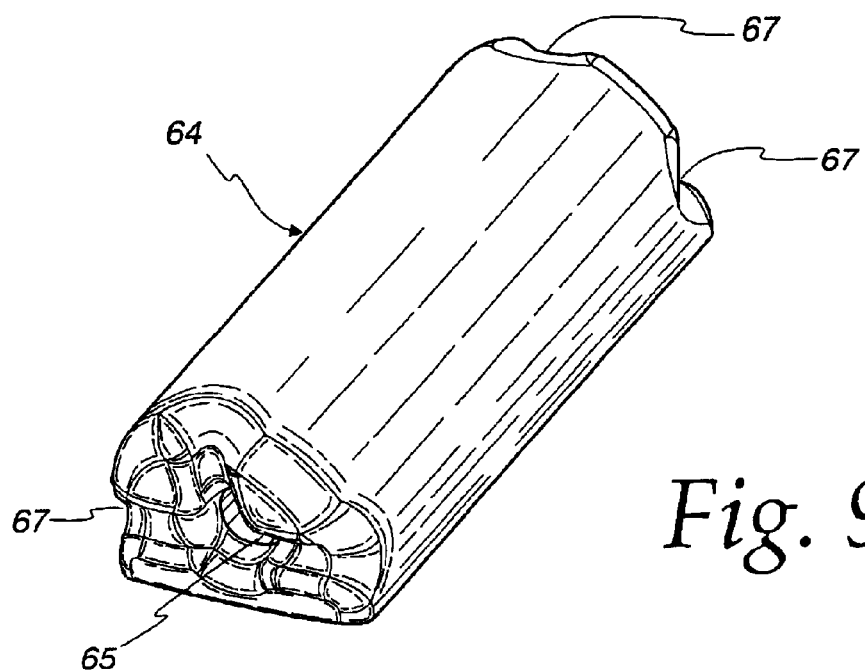
FIG. 9 is an adaptor for connection to a clip pin and a storage member.

FIG. 9 illustrates an adaptor 64 to be used with the mounting clip 20. The adaptor 64 is preferably made of plastic and includes holes 65 at each end through which the pin 54 extends. Detents 67 adjacent to the holes 65 permit storage components to be joined to the pin 54 and rest in the detents 67 to resist unwanted movement. The detents 67 are rounded to permit desired movement of the shelving components from one detent 67 to another.

Figure 10:
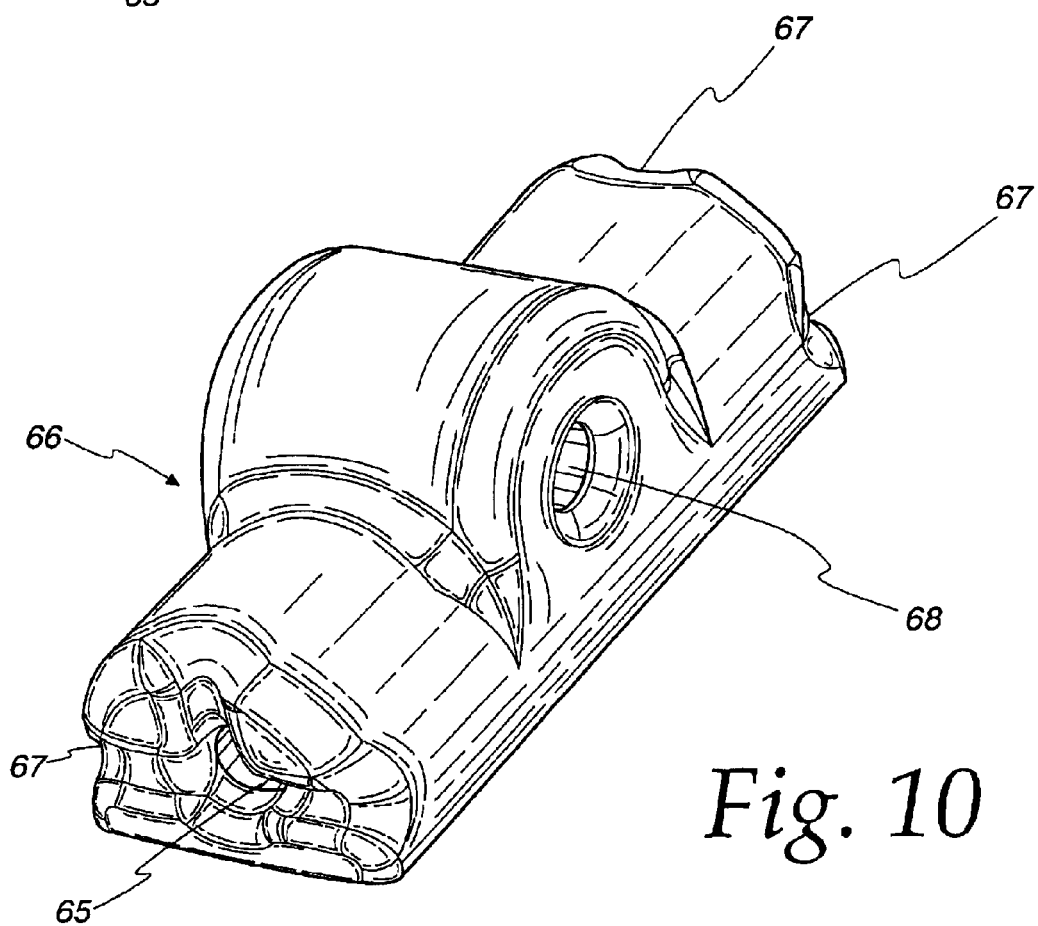
FIG. 10 is another embodiment of an adaptor.

FIG. 10 illustrates a second style of adaptor 66 that is similar to the FIG. 9 adaptor 64 with an additional transverse bore 68. A pin (not illustrated) can be inserted through the bore 68 to secure storage components.

Figure 11:
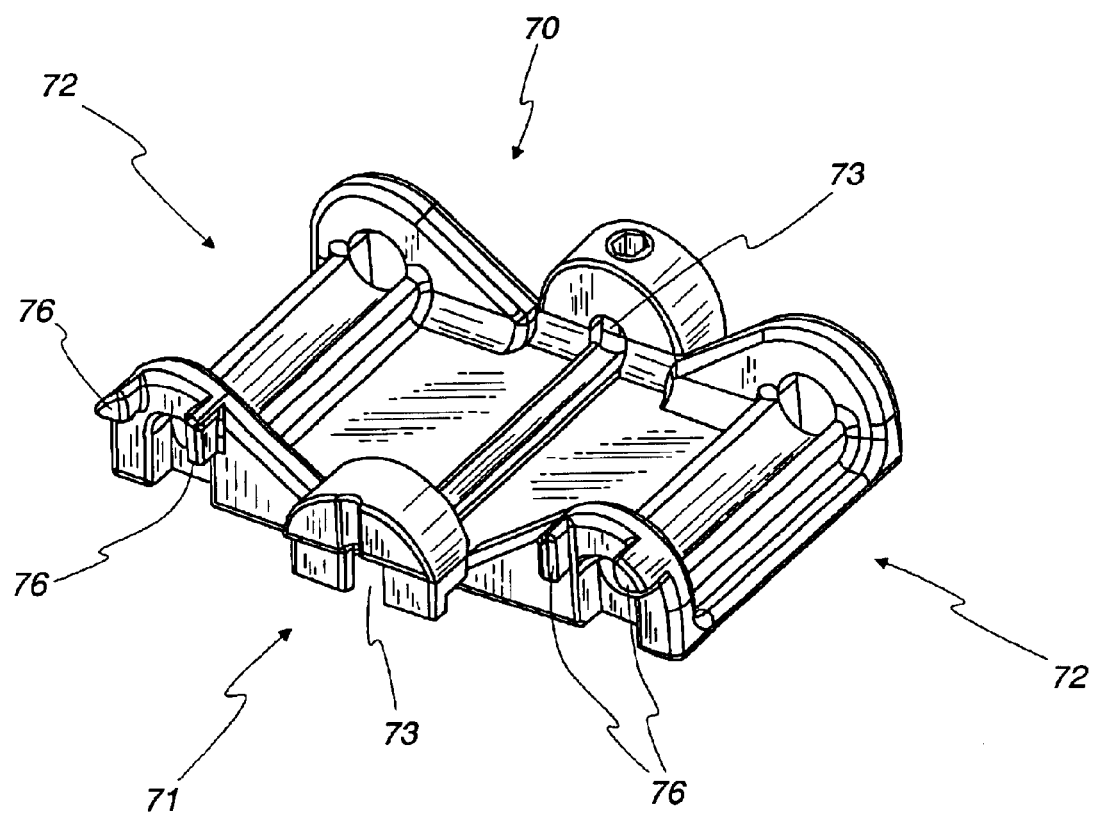
FIG. 11 is another embodiment of an adaptor.
Figure 12:
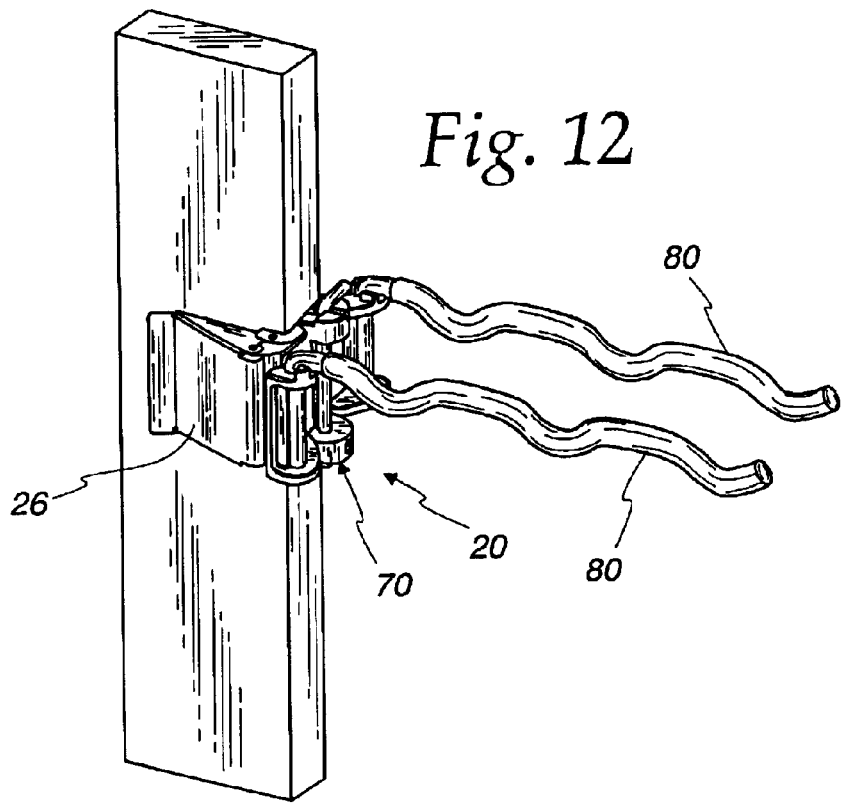
FIG. 12 is another embodiment of an adaptor and having a pair of outwardly extending flanges to provide a pair of aligned holes through which a pivoting storage member can be secured.
Figure 13:
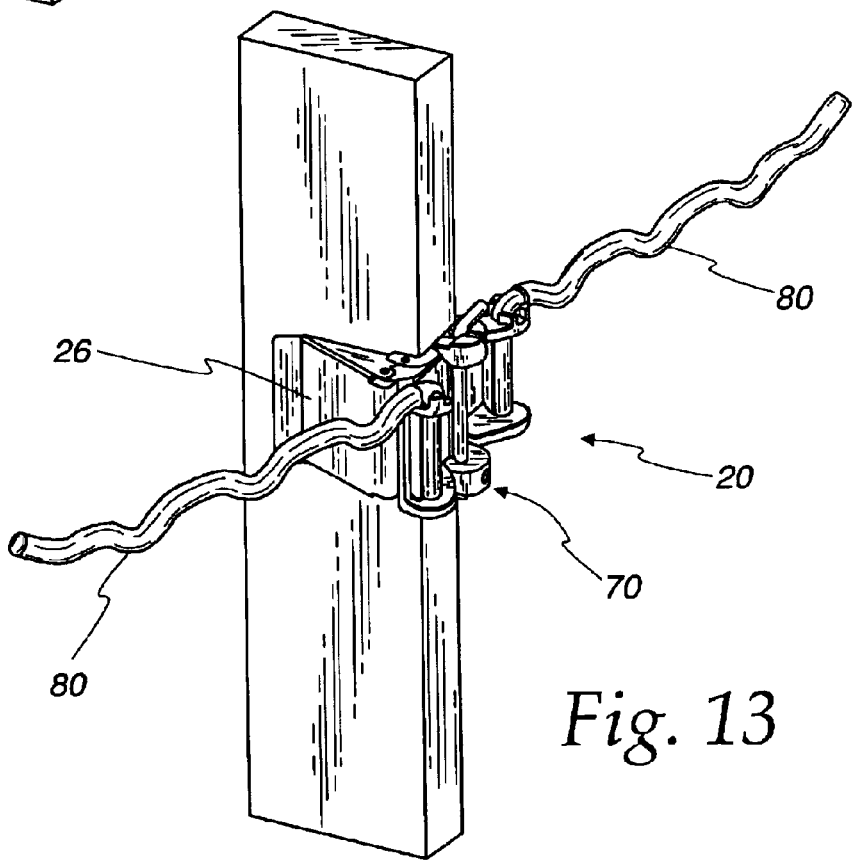
FIG. 13 is the adaptor of FIG. 11 installed on a clip with two pivotable rack members extending outwardly for storage of items such as bicycles.

FIGS. 11, 12, and 13 illustrate another embodiment of an adaptor 70 having a central portion 71, and two wing portions 72. The central portion 71 has pin holder locations 73 that engage a pin 54 in a manner similar to the bushings described above.

The wing portions 72 have retainer tabs 76 engage racks 80 (FIG. 13) that can be re-positioned as desired to give a user different storage configurations. To move a rack 80, it is lifted above the retainer tab 76 and reset to a new position. Gravity will typically hold the rack 80 in place when the adaptor is oriented in a vertical position with the stops directed upward.

Figure 14:
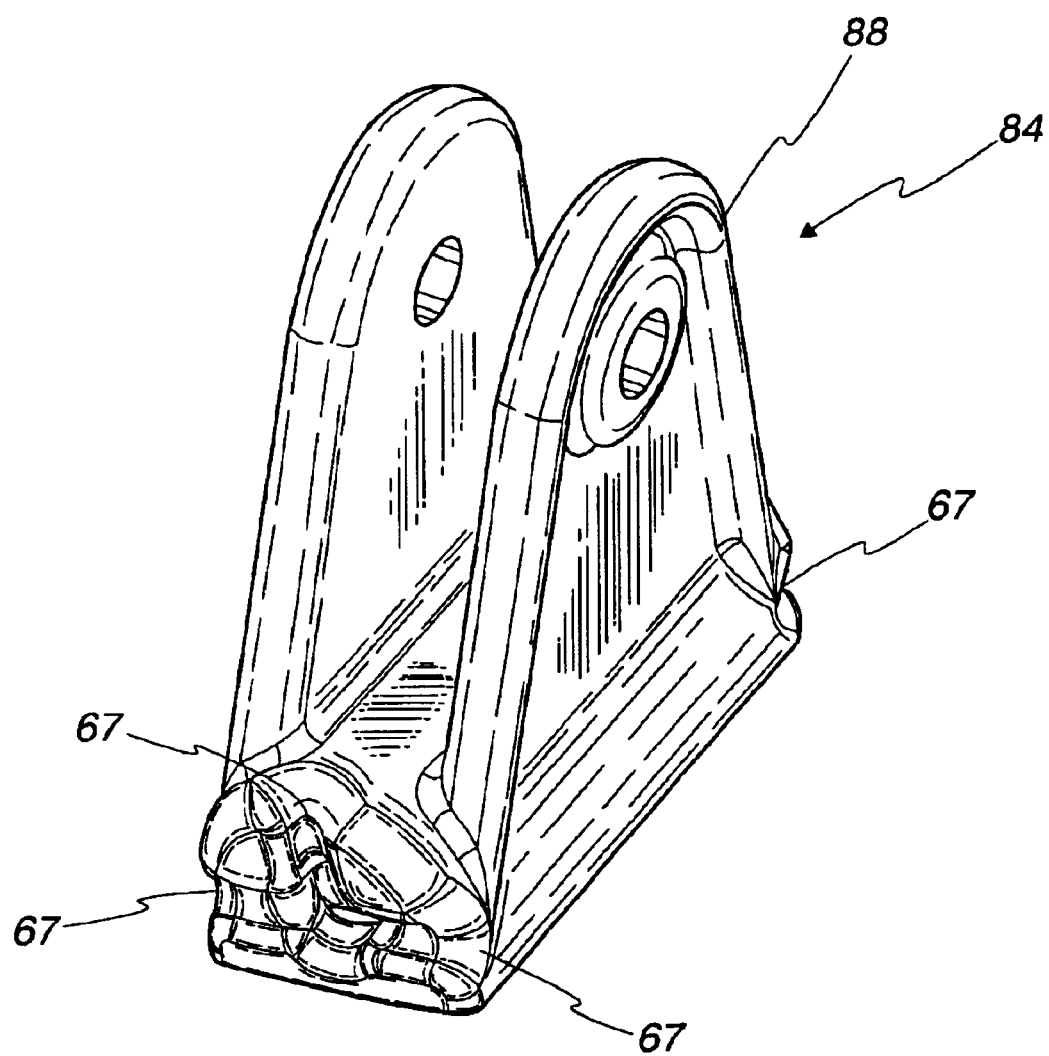
FIG. 14 is the installation of FIG. 11 with the two pivotable rack members pivoted to the side.
Figure 15:
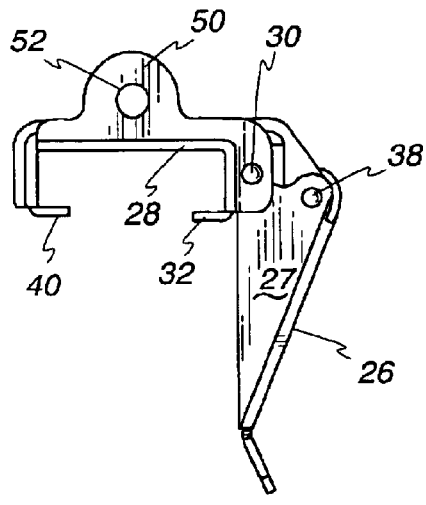
FIGS. 15A–D illustrates various dimensions of the embodiments described above.
Figure 15:
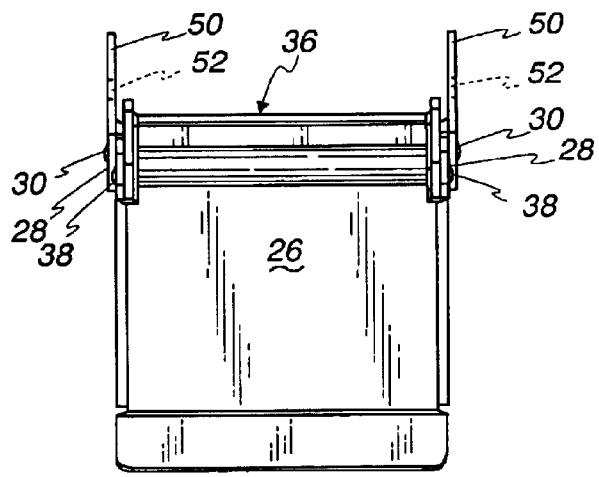
Figure 15:
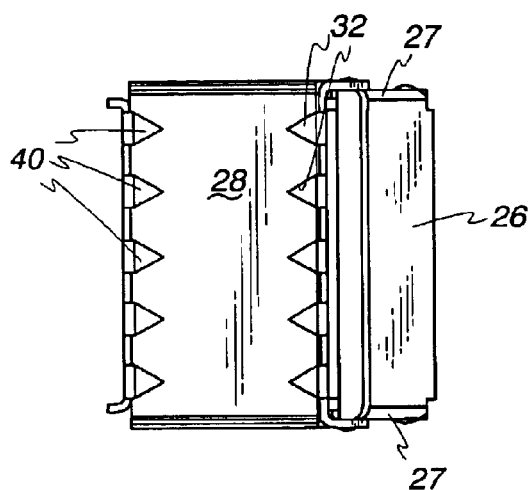
Figure 15:
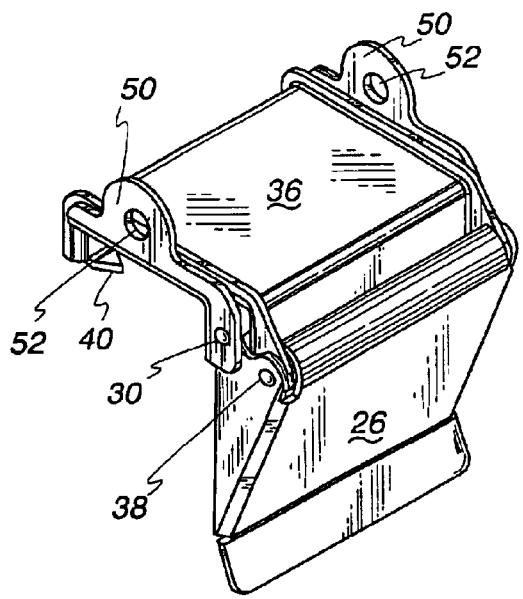
Figure 16:
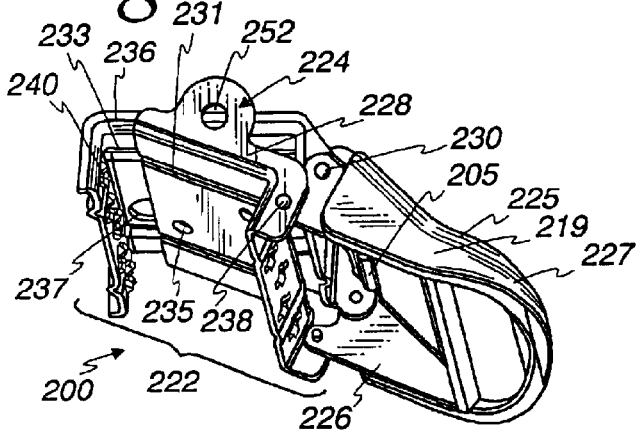
FIG. 16 is a perspective view of another embodiment of a mounting clip in an open position in accordance with the present invention.
Figure 17:
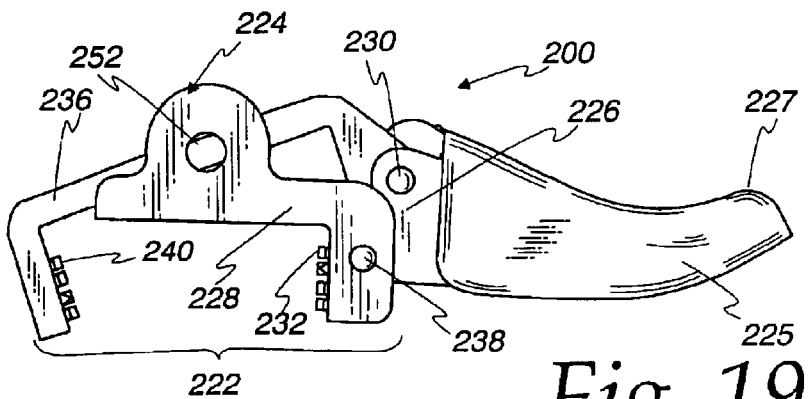
FIG. 17 is a side view of the mounting clip illustrated in FIG. 16.
Figure 18:
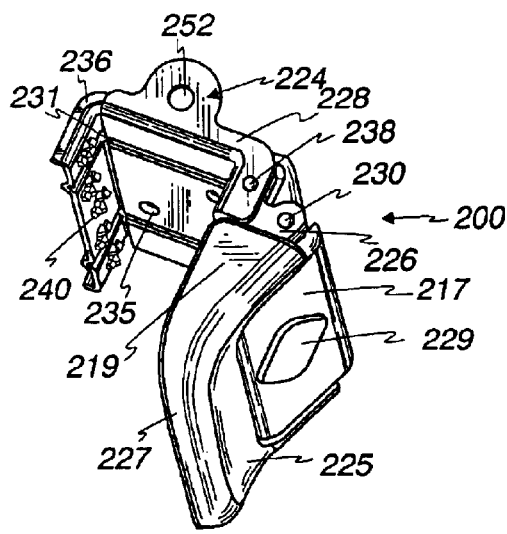
FIG. 18 is a perspective view of the mounting clip illustrated in FIG. 16 in a closed position.
Figure 19:
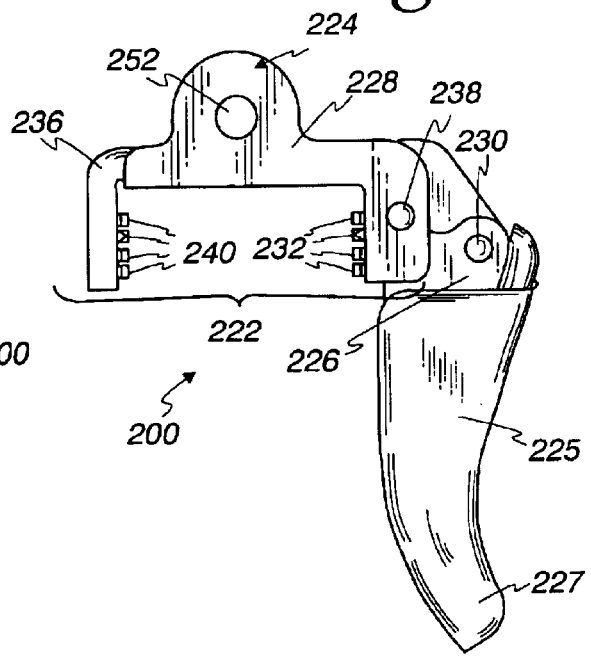
FIG. 19 is a side view of the mounting clip illustrated in FIG. 16 in a closed position.
Figure 20:
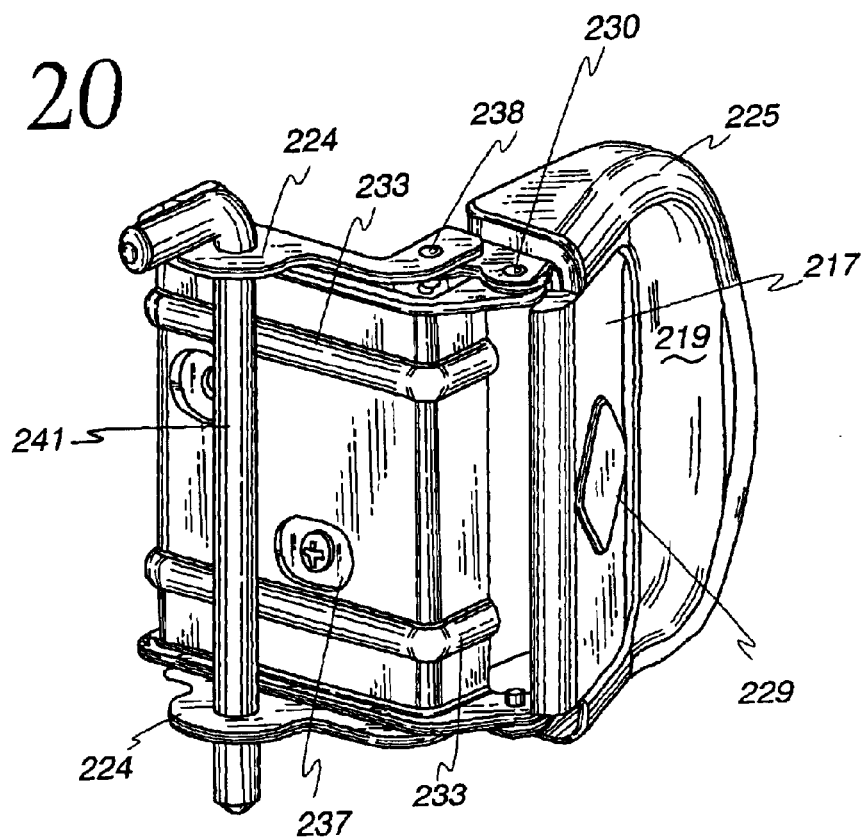
FIG. 20 is another perspective of the mounting clip illustrated in FIG. 16 in the closed position.

FIG. 14 is another adaptor 84 embodiment that provides transverse holes 88 for receipt of a transverse pin (not illustrated). The transverse pin can pivot to permit movement of a storage compartment connected thereto, and preferably this style of adaptor 84 can be used to mount a pulley used for hoisting heavier items.

The illustrated mounting clip 20 is preferably made of stainless steel to withstand corrosive environments or cold-rolled steel and/or plated if desired. Other materials will work also. The parts can be stamped out of sheet stock and bent to shape with adequate precision. The pin 54 is also preferably made of cold-rolled or stainless steel and it can be plated as desired. The adaptors described above are preferably plastic and are more preferably molded polypropylene or glass-filled nylon, or they can be zinc.

FIGS. 15A through 15D illustrate the preferred dimensions of a mount clip 20 for joining to a nominally sized two (one and one-half) inch board.

FIGS. 16 through 25 illustrate another embodiment of a mounting clip 200 in accordance with the present invention. This clip 200 includes a clamp 222 and an accessory mount 224, which is similar to the clamp 20 described above with a few exceptions. The clamp 222 includes a lever 226, a base plate 228, a first hinge 230, a clamping jaw 236, and a second hinge 238.

The lever 226 includes a cover 225 that provides added leverage due to its flared distal end 227. The smooth edges and corners also are less likely to cause discomfort to a user while being installed and uninstalled due to the ergonometric shape of the cover 225. Further, the cover 225 can provide a surface on which a corporate logo or other design 229 can be placed. Preferably, the cover 225 is made of a base 217 of relatively rigid material such as an olefin plastic, and a relatively soft grip 219 that is preferably a thermoplastic elastomer. The cover 225 includes tabs 205 which allow the cover to be snapped into the lever 226. Other means can also be used to connect the two.

The clamp 222 components are also somewhat modified in the mounting clip 200 as compared to the clamp 20 described above. The base plate 228 has inwardly extending teeth 232, but these are a different shape than those described in relation to the embodiment in FIGS. 1 to 4. In the mounting clip 200, the teeth 232, 240 are formed around generally circular openings. In a preferred embodiment, the teeth 232 and 240 are formed by piercing the base plate 228 and clamping jaw 236 so that the teeth 232 and 240 are essentially irregular triangular shapes that do not penetrate the wood excessively, but provide adequate grip. This formation of teeth is preferred over continuous ring-shaped teeth because the teeth 232 and 240 will not have as severe an impact on the board on which the clip is mounted. This is particularly beneficial when the clips 200 are going to be moved along the length of a board from time-to-time. It is not as critical when the clips 200 are relocated less frequently.

To further reduce the impact on the board, the teeth 232 and 240 are not all in a straight line vertically or horizontally (FIGS. 16 through 19). With such an arrangement, the mounting clip 200 can be relocated repeatedly up and down a board with minimal degradation of the board.

Further, the teeth 232 and 240 do not need to penetrate the board very deeply due to their shape and size. The increased number, shape, and arrangement of teeth permit the use of shorter teeth that are not as likely to damage the associated board.

The base plate 228 is also formed with integral ribs 231 to provide rigidity. The clamping jaw 236 includes mating ribs 233, also for rigidity.

Figure 21:
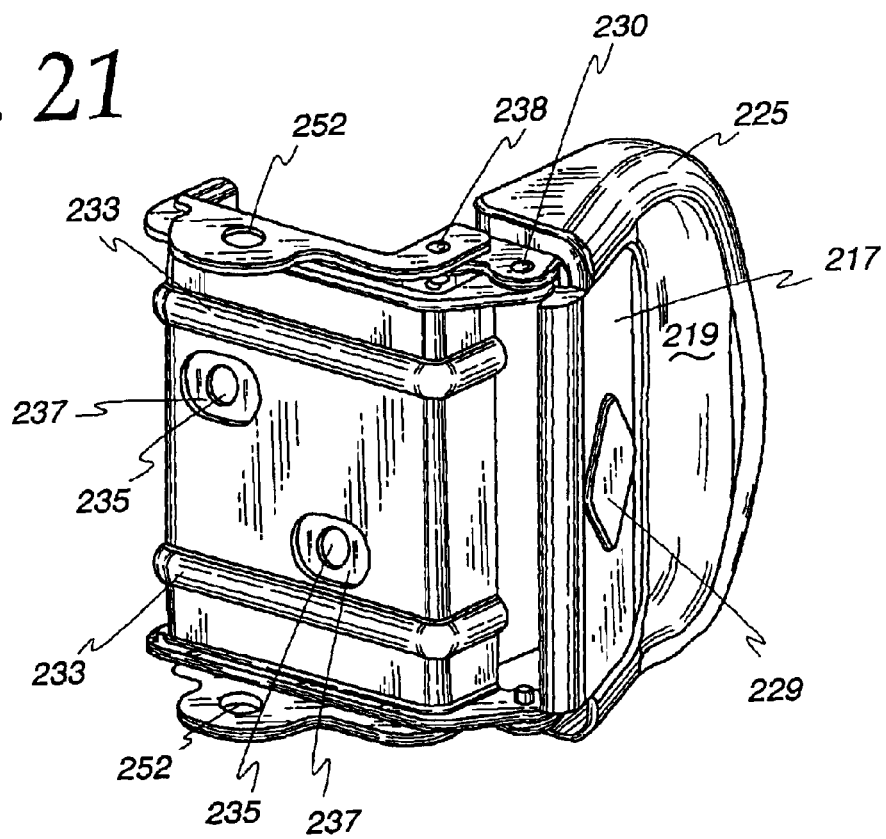
FIG. 21 is a perspective view of the mounting clip illustrated in FIG. 16 with a latch pin inserted to prevent inadvertent opening of the mounting clip.
Figure 22:
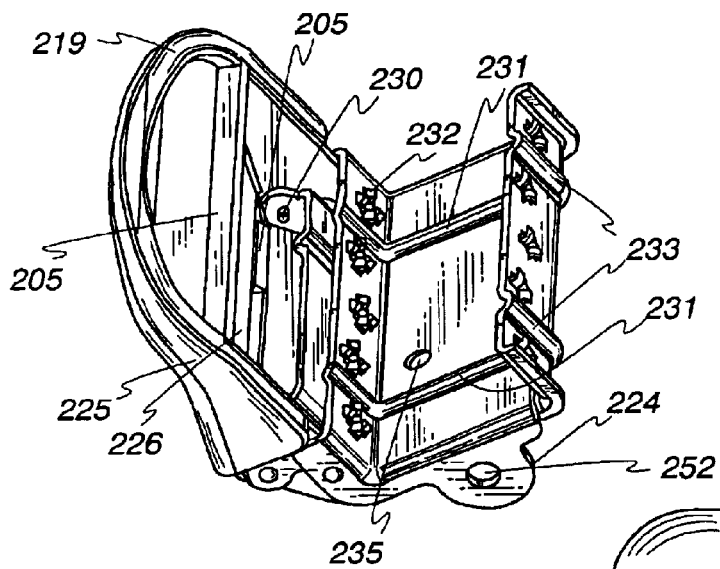
FIG. 22 is another perspective view of the mounting clip of FIG. 16 in a closed position.
Figure 23:
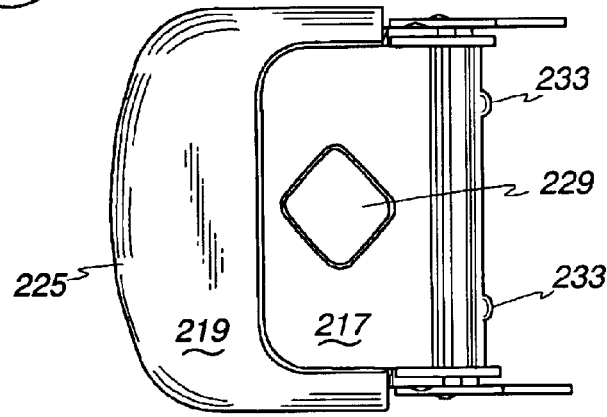
FIG. 23 is a side view of the storage clip illustrated in FIG. 16 in a closed position.
Figure 24:
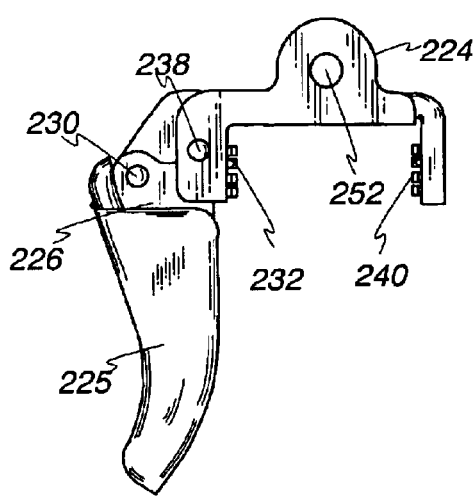
FIG. 24 is another side view of the storage clip illustrated in FIG. 16 in a closed position.
Figure 25:
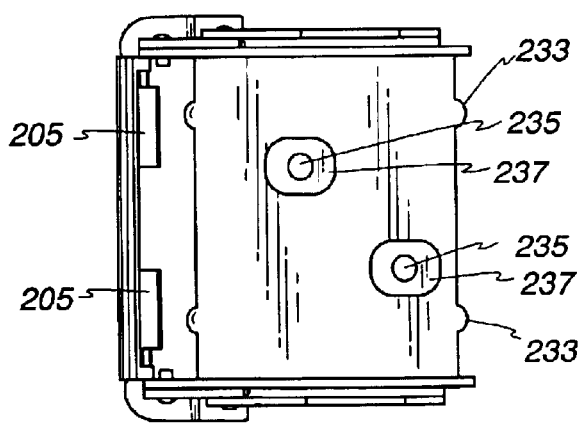
FIG. 25 is another side view of the storage clip illustrated in FIG. 16 in a closed position.

The base plate 228 of the mounting clip 200 also includes a pair of holes 235 through which nails, screws, or other fasteners can be driven into a board on which the mounting clip 200 is mounted. This provides additional load bearing capability, as well as serving as a theft inhibitor, but it is not necessary for most storage loads. A mating pair of slots 237 in the clamping jaw 236 aligns with the holes 235 so that whatever type of fastener is used, it can be installed after the mounting clip 200 has been moved to a closed position. (See: FIG. 21).

The mounting clip 200, otherwise is very similar to the mounting clip 20 in design, materials, and operation. As viewed in FIG. 20, when the mounting clip is closed, a pin 241 can be inserted through holes 252. When in this position, it is not possible to open the mounting clip 200 because the pin 241 prevents the over-center hinge effect of the mounting clip 200 by retaining clamping jaw 236 closely adjacent to the base plate 228. Other clip locking arrangements are possible in accordance with the present invention, but this particular arrangement is preferred so that the pin 241 can be readily installed and used to support accessories. Further, the pin 241 could be replaced by a lock that would deter unauthorized removal of the clips.

In alternate embodiments, the pin 241 is inserted through the holes 252 after an adaptor is placed over the mounting clip 200. Various adaptors are illustrated in FIGS. 26, 27, 28, 29, 30 and 31. Adaptors link the mounting clip 200 to a modular system of storage racks, shelves, cabinets, pulleys, straps, and others or they may serve as storage components themselves. Despite the variety of adaptors, they are all preferably shaped to be used on single shape of a mounting clip 200, so that the mounting clips 200 can be used with any adaptor or storage type that a user desires. This reduces storage system manufacturing costs and simplifies installation and assembly.

Figure 26:
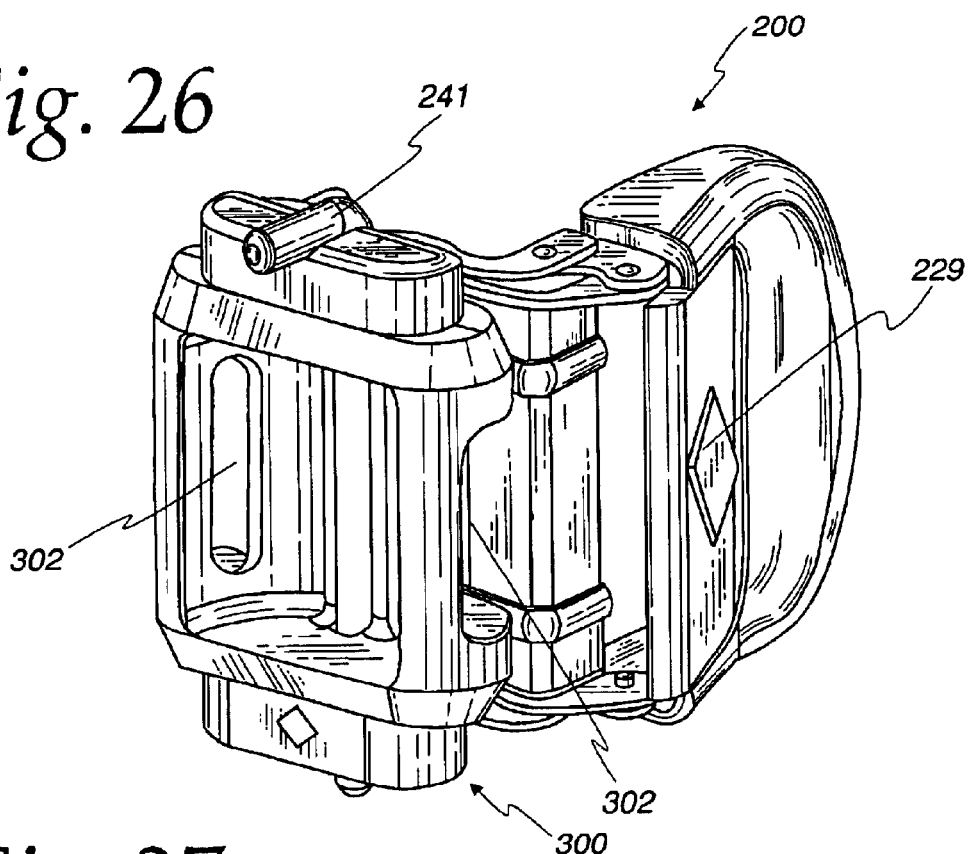
FIG. 26 is a perspective view of the mounting clip illustrated in FIG. 16 with an alternate embodiment of an adaptor in accordance with the present invention.
Figure 30:
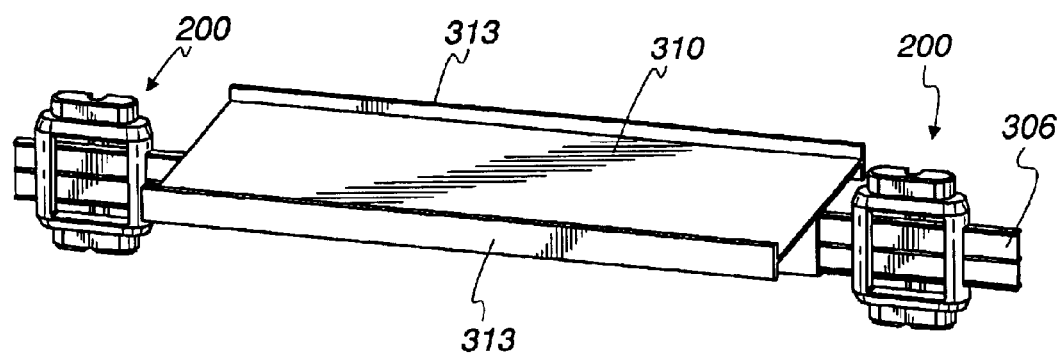
FIG. 30 is a perspective view of a shelf system for use with the adaptor of FIG. 26.
Figure 31:
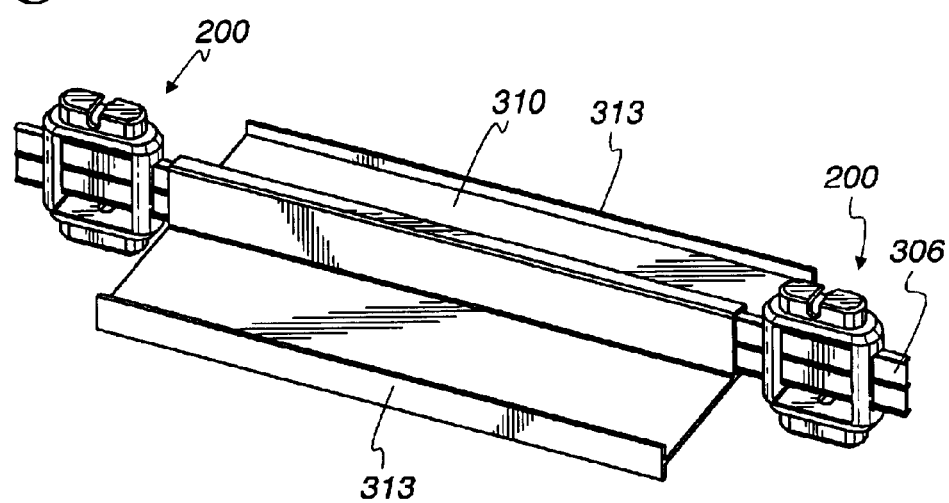
FIG. 31 is a perspective view of a shelf system for use with the adaptor of FIG. 26.
Figure 32:
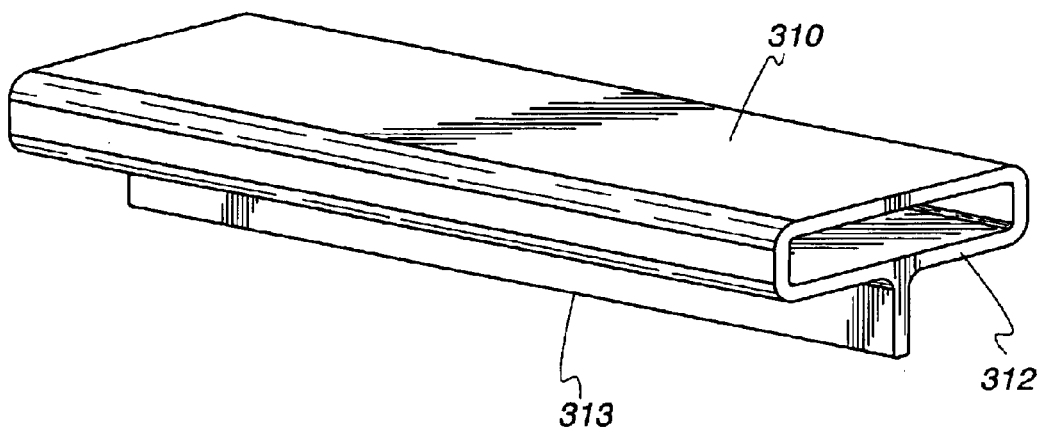
FIG. 32 is a perspective view of a shelf for use with the adaptor and mounting clip in accordance with the present invention.
Figure 33:
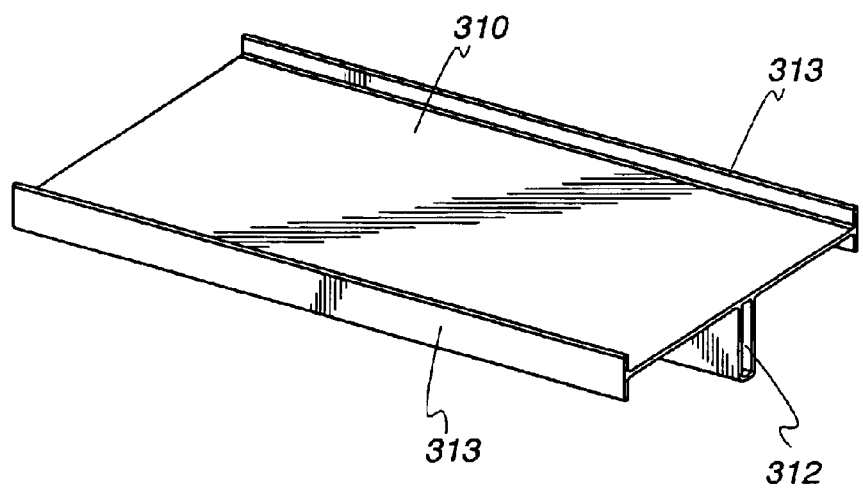
FIG. 33 is a perspective view of a shelf for use with the adaptor and mounting clip in accordance with the present invention.
Figure 34:
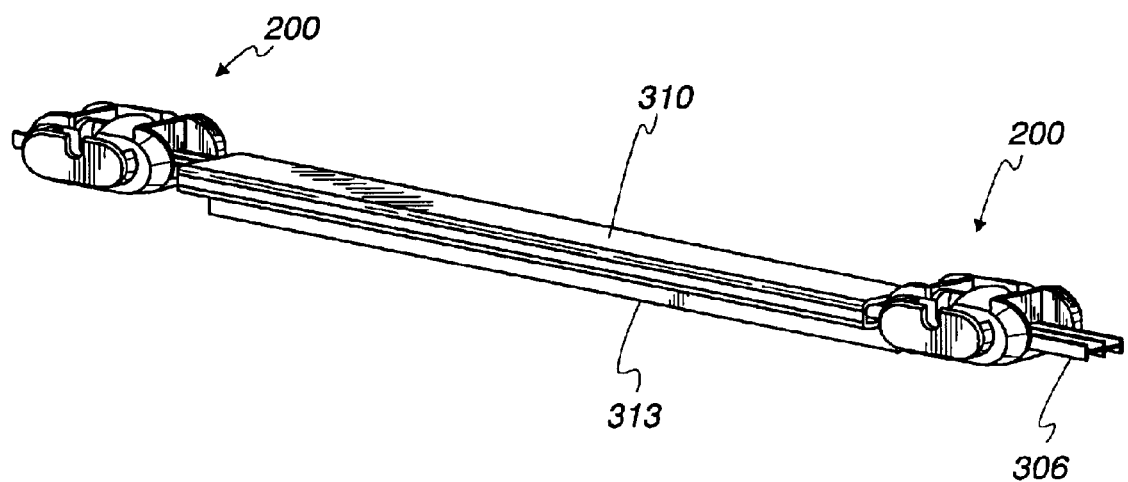
FIG. 34 is a perspective view of a bar support system for use with the adaptor and mounting clip of the present invention.

Referring to FIG. 26, there is an adaptor 300 joined to a mounting clip 200 via a pin 241. The adaptor 300 includes a pair of aligned slots 302, through which a strap, rope, chain, or preferably, a bar 306 (FIGS. 30, 31, and 34) is fed and other elements of a storage system are mounted thereon. For example, FIGS. 30, 31, and 34 illustrate an adaptor 300 with an elongated bar extending through the slots 302. The bar 306 also extends through a similar adaptor 300 joined to a mounting clip 200 on another stud, joist, or free-standing member. The bar 306 also is inserted through a shelf 310 having a slot 312 that mates with the bar 306. The shelf 310 of FIGS. 30 and 31 can be installed with either side facing up. In the FIG. 30 embodiment, the shelf 310 is simply flat for receiving any desired item to be stored.

In the FIG. 31 arrangement, the shelf 310 is "upside down," (with wall studs blocking the ends) the shelf defines a recess into which items can be stored that might otherwise be susceptible to falling or rolling of the shelf 310. Various webs 313 can be joined to or formed integrally with a shelf 310 to stiffen the shelf 310 to support heavier loads.

Figure 27:
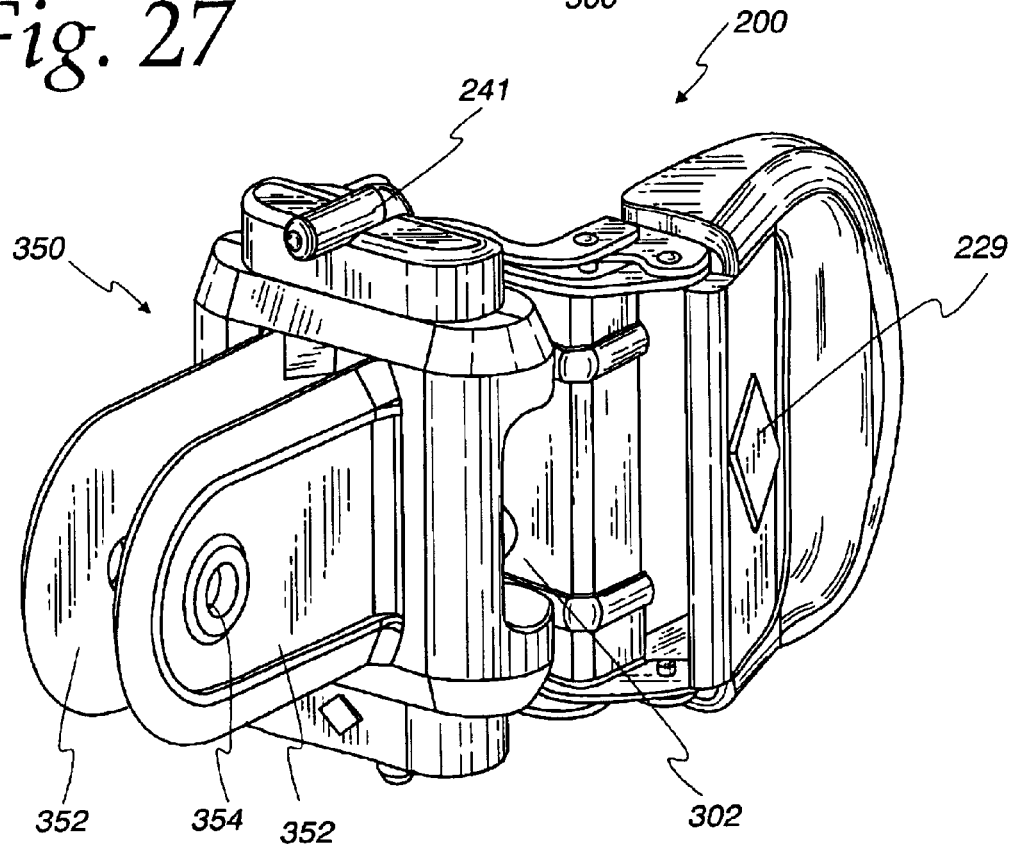
FIG. 27 is a perspective view of the mounting clip illustrated in FIG. 16 with an alternate embodiment of an adaptor in accordance with the present invention.

FIG. 27 illustrates another adaptor 350, which is nearly identical to the adaptor 300, except that adaptor 350 includes a pair of spaced apart flanges 352 that have aligned holes 354 through which a pulley axle can be inserted, for example. Other storage components can also be mounted on the flanges 352.

Figure 28:
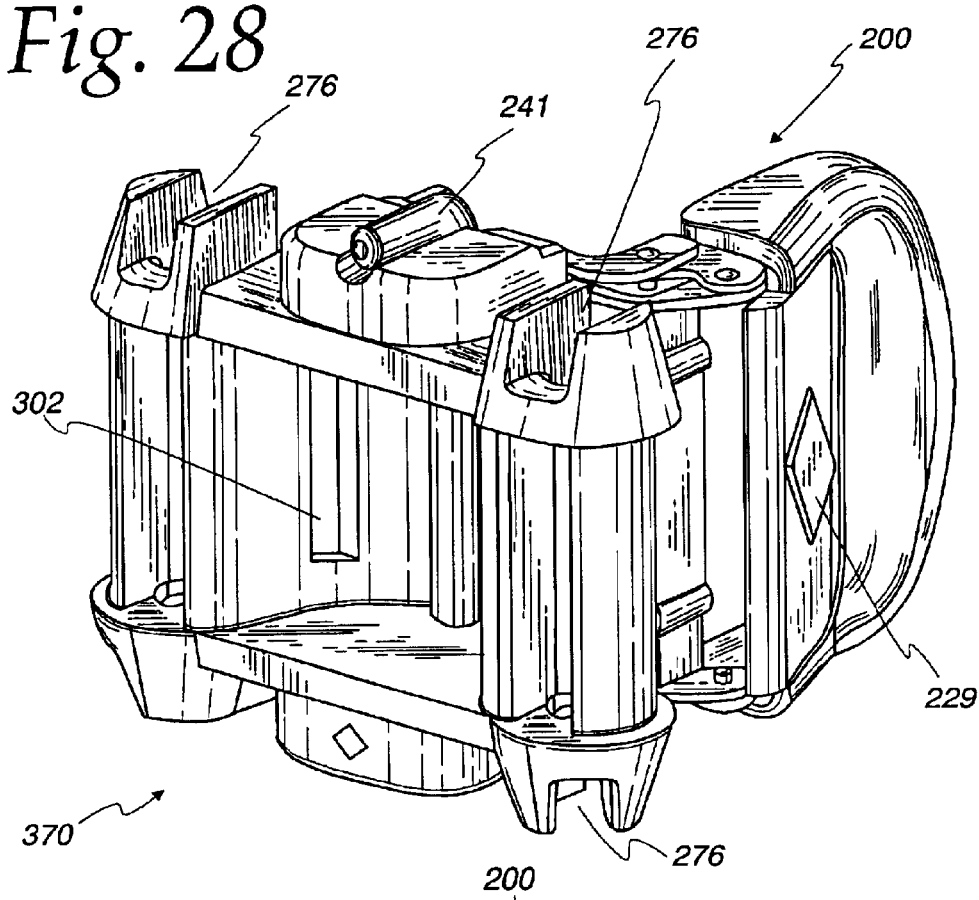
FIG. 28 is a perspective view of the mounting clip illustrated in FIG. 16 with an alternate embodiment of an adaptor in accordance with the present invention.

FIG. 28 illustrates an adaptor 370 that is similar in operation to the adaptor 70 illustrated in FIG. 12, except that adaptor 370 includes a recess 356 for securing the pin 241 and a pair of slots 302 for use as described above. This adaptor 370 also includes retention slots 276 for limiting movement of storage elements such as rack 80 illustrated in FIG. 12.

Figure 29:
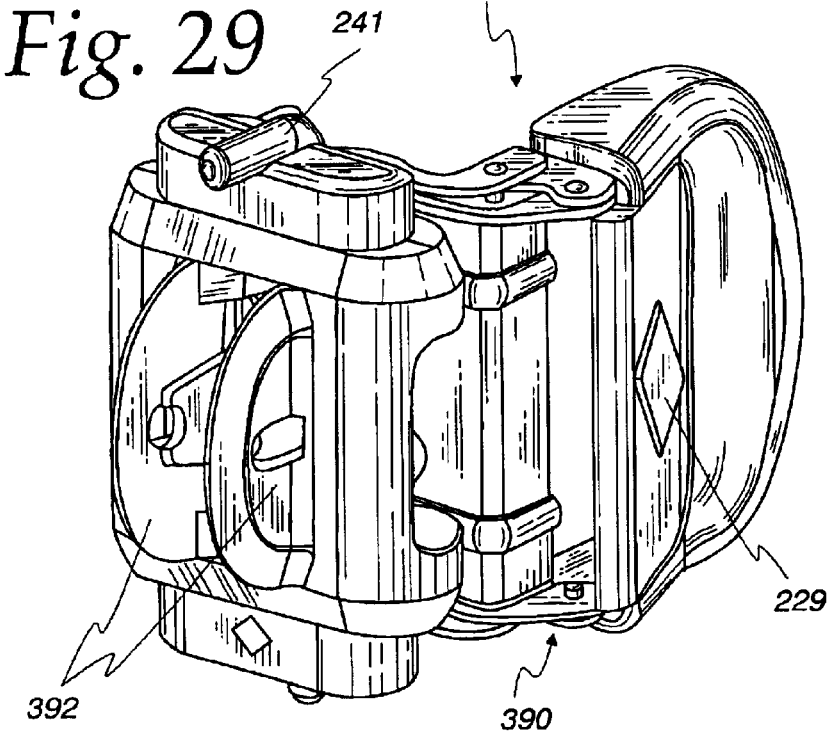
FIG. 29 is a perspective view of the mounting clip illustrated in FIG. 16 with an alternate embodiment of an adaptor in accordance with the present invention.

FIG. 29 illustrates an adaptor 390 with a pair of reinforced flanges 392 that can be used as described above in relation to adaptor 350 in FIG. 27.

FIG. 34 illustrates an embodiment wherein the components are joined to ceiling joists to support loads that can be placed on top of the shelf 310 or hung therefrom.

Also, because the modular storage components are interchangeable and may be used in different storage situations, it is possible to use them without a mounting clip of the type described herein. Instead, a mounting plate without the clamp feature of the mounting clip, can be fastened to a flat surface, such as a wall, and used with adaptors and storage components such as those described herein.

The bar 306 and shelf 310 are preferably extruded plastic or aluminum, but other shapes and materials can be used.

The foregoing detailed description is intended for clearness of understanding the invention, and no unnecessary limitations therefrom should be read into the following claims.

What is claimed is:

1. A releasable mounting clip comprising:
   a clamp having:
      a lever;
      a base plate pivotably joined to the lever at a first location; and
      a clamping jaw pivotably joined to the lever at a second position offset from the first position; wherein the lever moves the mounting clip between opened and closed positions; and
   an accessory mount joined to the clamp, and adapted to be secured to a plurality of modular storage components.

2. The mounting clip of claim 1, wherein the accessory mount is joined to the base plate.

3. The mounting clip of claim 1, wherein the accessory mount is joined to the clamping jaw.

4. The mounting clip of claim 1, wherein the accessory mount is joined to the lever.

5. The mounting clip of claim 1, wherein the accessory mount is joined to a hinge connecting the lever to the base plate.

6. The mounting clip of claim 1, wherein the accessory mount is joined to a hinge connecting the lever to the clamping jaw.

7. The mounting clip of claim 1, wherein the accessory mount comprises:
   a pair of ears extending outwardly from the base plate.

* * * * *